(12) United States Patent
Cheng et al.

(10) Patent No.: US 11,022,985 B2
(45) Date of Patent: Jun. 1, 2021

(54) DISCRETE VALVE FLOW RATE CONVERTER

(71) Applicant: Fluid Handling LLC., Morton Grove, IL (US)

(72) Inventors: Andrew A. Cheng, Wilmette, IL (US); James J. Gu, Buffalo Grove, IL (US)

(73) Assignee: FLUID HANDLING LLC, Morton Grove, IL (US)

( * ) Notice: Subject to any disclaimer, the term of this patent is extended or adjusted under 35 U.S.C. 154(b) by 0 days.

(21) Appl. No.: 14/969,723

(22) Filed: Dec. 15, 2015

(65) Prior Publication Data

US 2016/0186889 A1    Jun. 30, 2016

Related U.S. Application Data

(60) Provisional application No. 62/091,965, filed on Dec. 15, 2014.

(51) Int. Cl.
*G05D 7/00* (2006.01)
*G01F 25/00* (2006.01)
(Continued)

(52) U.S. Cl.
CPC .............. *G05D 7/00* (2013.01); *F04B 53/10* (2013.01); *G01F 1/36* (2013.01); *G01F 15/005* (2013.01);
(Continued)

(58) Field of Classification Search
CPC ........... G05D 7/00; G01F 1/36; G01F 15/005; G01F 25/0007; F04B 53/10
See application file for complete search history.

(56) References Cited

U.S. PATENT DOCUMENTS

| | | | |
|---|---|---|---|
| 3,170,630 A | | 2/1965 | Chadwick |
| 3,518,974 A | * | 7/1970 | Bradley .................... F22D 5/10 |
| | | | 122/451 R |

(Continued)

FOREIGN PATENT DOCUMENTS

| | | |
|---|---|---|
| CN | 1514960 A | 7/2004 |
| CN | 104024965 A | 9/2014 |

(Continued)

OTHER PUBLICATIONS

Lahti, M., and E. Heikkinen. Geophysical borehole logging and optical imaging of the Pilot Hole ONK-PH2. Posiva Oy, Helsinki (Finland), 2005. See http://www.iaea.org/inis/collection/NCLCollectionStore/_Public/44/091/44091453.pdf, which discloses a downhole probe with Transmitter and receiver for borehole surveys and petrophysical samples taken from those boreholes (pp. 9 and 23 for software; the equipment array on the 67th to 70th Pages).

(Continued)

*Primary Examiner* — Matthew E. Gordon
(74) *Attorney, Agent, or Firm* — Ware, Fressola, Maguire & Barber LLP

(57) ABSTRACT

A discrete valve flow rate converter is provided to obtain a system flow through a valve in a dynamic hydronic pumping system, e.g., based on signaling containing information about the valve's differential pressure and the valve's hydronic characteristics calibration data. The discrete valve flow rate converter resolves the valve system flow rate directly and accurately with the valve's open position and the corresponding valve differential pressure signals associated therewith. The discrete valve flow rate converter may be applied to all kinds of valves as long as their open position and differential pressure associated with is available, e.g., including implementations for control valve applications, e.g., where the valve open position is controlled (Continued)

Valve flow rate measurement system with a 3D valve flow rate converter.

automatically and accurately, as well as implementations either for pumping system pressure controls with the flow rate known, such as adaptive hydronic system pressure controls, or as an alternative to sensorless pump monitoring and control.

16 Claims, 4 Drawing Sheets

(51) Int. Cl.
  *G01F 1/36* (2006.01)
  *F04B 53/10* (2006.01)
  *G01F 15/00* (2006.01)
(52) U.S. Cl.
  CPC ...... *G01F 25/0007* (2013.01); *F04B 2205/09* (2013.01)

(56) References Cited

U.S. PATENT DOCUMENTS

| | | | |
|---|---|---|---|
| 3,610,523 A | 10/1971 | Troy | |
| 4,277,832 A | 7/1981 | Wong | |
| 5,209,401 A | 5/1993 | Fiedrich | |
| 5,472,014 A | 12/1995 | Carlson | |
| 6,053,416 A | 4/2000 | Specht et al. | |
| 6,227,177 B1* | 5/2001 | Yamafuji | F02D 41/0042 123/399 |
| 6,991,028 B2 | 1/2006 | Comeaux et al. | |
| 7,284,709 B2 | 10/2007 | Guyer | |
| 7,445,025 B2 | 11/2008 | Shafique et al. | |
| 8,024,161 B2 | 9/2011 | Pekar et al. | |
| 8,109,289 B2 | 2/2012 | Trnka et al. | |
| 8,700,221 B2 | 4/2014 | Cheng et al. | |
| 8,788,105 B2 | 7/2014 | Loeffler | |
| 2005/0060108 A1* | 3/2005 | Ku | G01F 15/063 702/62 |
| 2009/0162950 A1* | 6/2009 | Kuboi | H01J 37/32935 438/5 |
| 2011/0098946 A1 | 4/2011 | Curtiss, III | |
| 2011/0313517 A1 | 12/2011 | Reichenbach et al. | |
| 2012/0043487 A1 | 2/2012 | Volovec | |
| 2012/0173027 A1* | 7/2012 | Cheng | F04D 15/0066 700/282 |
| 2013/0008264 A1 | 1/2013 | McDaniel et al. | |
| 2013/0240045 A1 | 9/2013 | Feng | |
| 2014/0005841 A1 | 1/2014 | Cheng et al. | |
| 2014/0229022 A1 | 8/2014 | Deivasigamani et al. | |
| 2014/0249682 A1 | 9/2014 | Cheng et al. | |
| 2014/0288716 A1 | 9/2014 | Cheng et al. | |

FOREIGN PATENT DOCUMENTS

| | | | |
|---|---|---|---|
| EP | 0061856 A2 | 10/1982 | |
| EP | 0540079 A1 | 5/1993 | |
| EP | 2623823 | 8/2013 | |
| EP | 2772818 | 9/2014 | |
| WO | 0225391 A1 | 3/2002 | |
| WO | 02086632 A2 | 10/2002 | |
| WO | 2011104419 | 9/2011 | |
| WO | 2011104419 A1 | 9/2011 | |
| WO | WO 2011104419 A1 * | 9/2011 | ......... G05B 23/0235 |

OTHER PUBLICATIONS

Killeen, P. G. "Borehole geophysics: Exploring the third dimension." Proceedings of Exploration. vol. 97. 1997. See http://dmec.ca/ex07-dvd/Decennial%20Proceedings/Expl97/01_04___.pdf Disclosing six types of measurement cofigurations possible for borehole geophysical measurements logging mineral deposit signatures (pp. 31-32; Figure 2).

Wild, Peter, Andrew Siddans, and Keith Kennaugh. "Optical Televiewer survey and processing in Olkiluoto site, Finland 200 1-Boreholes KR9. KR 12. KR 13 and KR 14." Helsinki, Posiva Oy. Working Report 2 (2002): 31. See http://www.posiva.fi/files/2125/POSIVA-2002-02_Working-report_web.pdf, which discloses borehole inspection camera (pp. 34-36 with software and logging on pp. 39-49).

McMonnies, B., and V. Gerrie. "Ground geophysics and borehole logging—A decade of improvements." Exploration in the new millennium: Proceedings of the Fifth Decennial International Conference on Mineral Exploration. 2007. See http://www.dmec.ca/ex07-dvd/E07/pdfs/3.pdf, which discloses distributed borehole logging acquisition systems (pp. 42 and 48).

Majapuro, Johan. Geophysical borehole logging, dummy-sanding and optical imaging of the borehole OL-KR24 at Olkiluoto 2005. Posiva Oy, Helsinki (Finland), 2006. See http://www.iaea.org/inis/collection/NCLCollectionStore/_Public/43/061/43061172.pdf, which discloses geophysical borehole logging borehole sensors with digital signal processor charge-coupled device camera optics (pp. 7 and 22-23 for equipment array).

Patrick, John M. "Digital Borehole Logging Instrumentation and Software." Proceedings of the Symposium on the Application of Geophysics to Engineering and Environmental Problems. The Society, 1990. See https://info.ngwa.org/GWOL/pdf/900152825.PDF, which discloses an earlier application of downhole analog & digital electronics (p. 1005; software on pp. 1010-1012).

English language Abstract for CN1514960A not available. English language Abstract of corresponding document WO02086632 provided.

English language Abstract of CN104024965A.

* cited by examiner

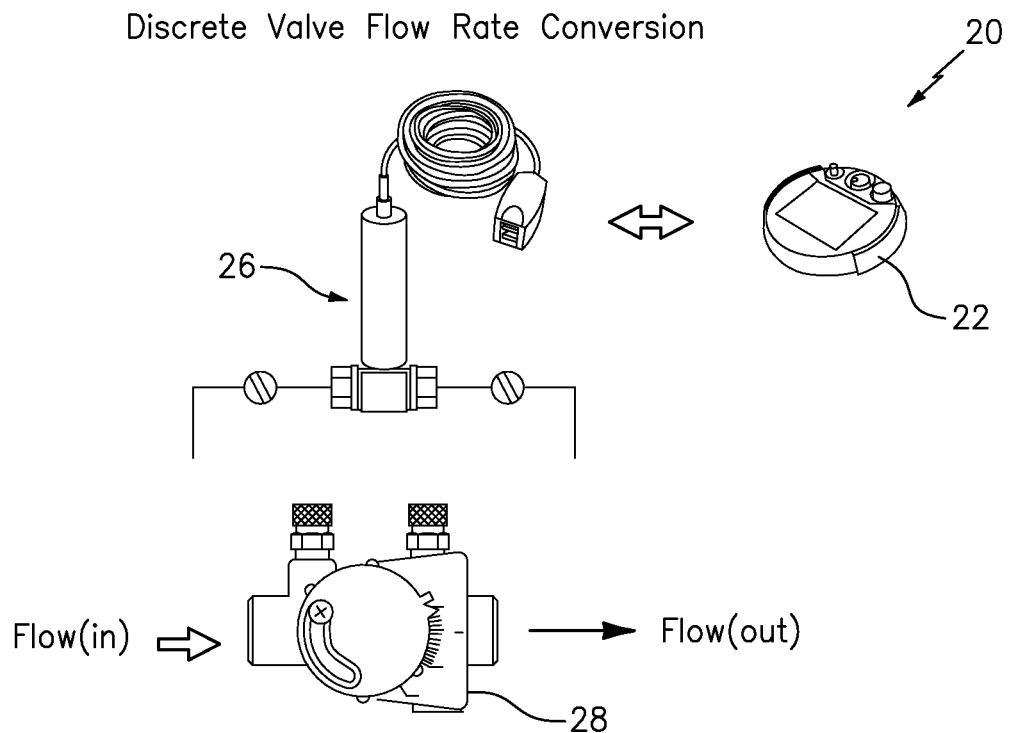
FIG. 1: Valve flow rate measurement system with a 3D valve flow rate converter.
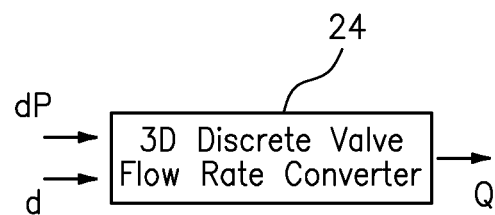
FIG. 2: A 3D discrete valve flow rate converter for a valve flow rate Q with a given valve open position d and across a valve differential pressure dP.

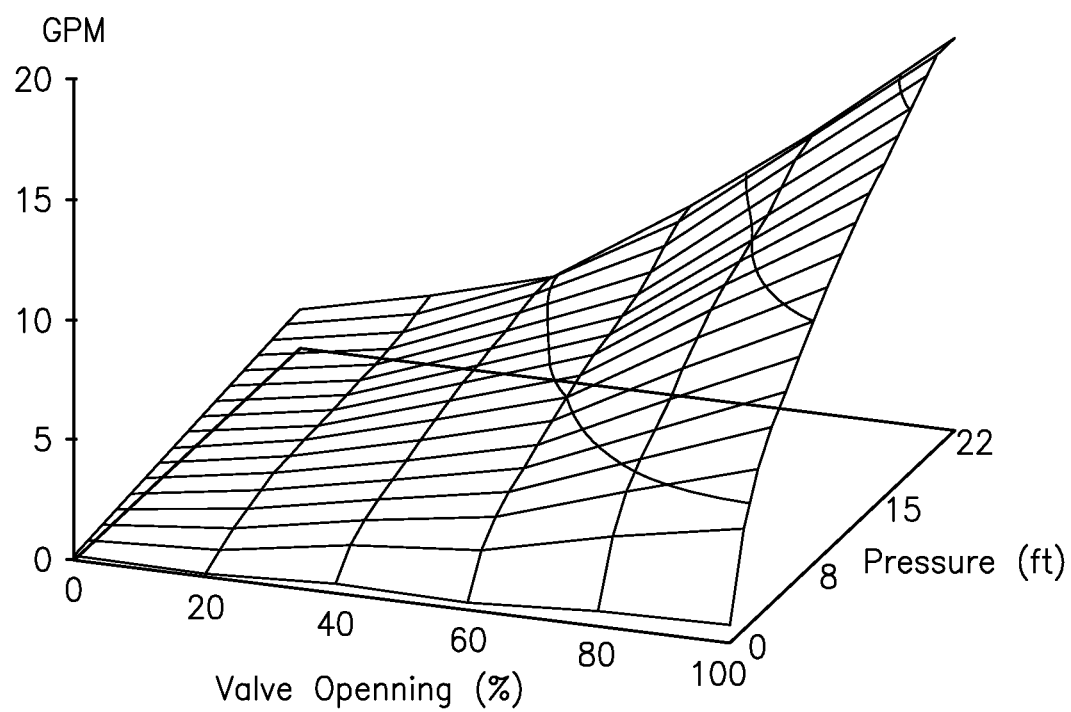
FIG. 3: The distribution of valve system characteristics.

FIG. 4  Comparison of testing results using the discrete valve flow rate converter (squares) and the corresponding flow meter readings (circles) on a circuit setter respectively.

```
┌─────────────────────────────────────────────────────────────┐
│ Apparatus 10                                                │
│                                                             │
│  ┌───────────────────────────────────────────────────────┐  │
│  │ Signal processor or processing module 10a configured  │  │
│  │ at least to:                                          │  │
│  │                                                       │  │
│  │     receive signaling containing information about    │  │
│  │ differential pressure sensed across a valve in an     │  │
│  │ open position and system characteristics calibration  │  │
│  │ data plotted as a discrete distribution function;     │  │
│  │                                                       │  │
│  │     determine corresponding signaling containing      │  │
│  │ information about a discrete valve flow rate of the   │  │
│  │ valve, based upon the signaling received; and/or      │  │
│  │                                                       │  │
│  │     provide corresponding signaling containing        │  │
│  │ information about the discrete valve flow rate.       │  │
│  └───────────────────────────────────────────────────────┘  │
│                                                             │
│  ┌───────────────────────────────────────────────────────┐  │
│  │ Other signal processor circuits or components 10b     │  │
│  │ that do not form part of the underlying invention,    │  │
│  │ e.g., including input/output modules, one or more     │  │
│  │ memory modules, data, address and control busing      │  │
│  │ architecture, etc.                                    │  │
│  └───────────────────────────────────────────────────────┘  │
└─────────────────────────────────────────────────────────────┘
```

*FIG. 5*: Implementation of Signal Processing Functionality

DISCRETE VALVE FLOW RATE CONVERTER

CROSS REFERENCE TO RELATED APPLICATION

This application claims benefit to U.S. provisional application No. 62/091,965, filed 15 Dec. 2014, entitled "Discrete valves flow rate converter," which is hereby incorporated by reference in its entirety.

This application is also related to a family of technologies developed by one or more of the inventors herein, and disclosed in the following applications:

[1] U.S. application Ser. No. 12/982,286, filed 30 Dec. 2010, entitled "Method and apparatus for pump control using varying equivalent system characteristic curve, AKA an adaptive control curve," which issued as U.S. Pat. No. 8,700,221 on 15 Apr. 2014; and U.S. application Ser. No. 13/717,086, filed 17 Dec. 2012, entitled "Dynamic linear control methods and apparatus for variable speed pump control," which claims benefit to U.S. provisional application No. 61/576,737, filed 16 Dec. 2011, now abandoned;

which are all assigned to the assignee of the instant patent application, and all incorporated by reference in their entirety.

The present invention builds on the family of technologies disclosed in the aforementioned related applications, as well as the other patent applications identified below.

BACKGROUND OF THE INVENTION

1. Field of the Invention

The present invention relates to a technique for determining a flow rate of a valve; and more particularly, the present invention relates to a method and apparatus for determining the flow rate of a valve, e.g., in a dynamic hydronic pumping system.

2. Brief Description of Related Art

The aforementioned patent applications set forth above in [1] and [2] disclose adaptive pressure control techniques to save pump operation energy, in which the system flow rate besides of the system pressure is needed to obtain the hydronic system characteristics curves in the adaptive control. To be able to apply in a hydronic control system where there is no flow meter installed, the aforementioned patent applications set forth above in [3] and [4] disclose sensorless pump flow and pressure converters as well, which may be used to provide the instant system flow as well as pressure for the adaptive controls. Since there are always some pressure control hydronic cooling or heating systems equipped with a control valve as well as a differential pressure sensor for pressure and flow control, one may use them directly to obtain the system flow rate without a need of a flow meter or pump sensorless flow and pressure converters.

SUMMARY OF THE INVENTION

In summary, the present invention takes the form of a discrete valve flow rate converter that provides a system flow rate through a valve at any open position, based on the valve's differential pressure and the valve's hydronic characteristics calibration data. The discrete valve flow rate converter may be applied to many different kinds of valves. However, it is preferably to be used for control valve applications, e.g., where the valve's open position can be controlled automatically and accurately.

By way of example, the present invention provides a new and unique technique for determining a flow rate of a valve. According to some embodiments, the present invention may include, or take the form of, a method or apparatus for determining the flow rate of a valve, e.g., in a dynamic hydronic pumping system, featuring a signal processor or signal processing module, configured to:

receive signaling containing information about a differential pressure sensed across a valve in an open position and system characteristics calibration data plotted as a discrete distribution function; and determine corresponding signaling containing information about a discrete valve flow rate of the valve, based upon the signaling received.

According to some embodiments, the present invention may include one or more of the following features:

The signal processor or processing module may be configured to provide corresponding signaling containing information about the discrete valve flow rate determined, including where the corresponding signaling is provided to control the valve, e.g., including the opening or closing of the valve.

The corresponding signaling may be used as control signaling in a pumping hydronic control system in a dynamic hydronic pumping system.

The signal processor or processing module may be configured in, or forms part of, a 3-dimensional (3D) discrete valve flow rate converter that responds to associated signaling containing information about both a sensed differential pressure dP across the valve and a given valve open position d of the valve, and provides the discrete valve flow rate Q by utilizing the discrete distribution function to reconstruct the discrete value flow rate Q in terms of the differential pressure dP and the given valve open position d, based upon the system characteristic calibration data and numerical interpolations using the Equation:

$$g(Q, dP, d)=0,$$

where g is the discrete distribution function of the discrete valve flow rate, Q, with respect to the differential pressure dP across the valve with the given open position d.

The apparatus may include a differential pressure sensor configured across the valve, where the signaling contains information about the differential pressure provided or generated from or by the differential pressure sensor.

The apparatus may include, or form part of, a valve flow rate measurement system.

The apparatus may include a mobile CPU device having a discrete flow rate converter configured therein to provide the discrete value flow rate at the given open position, based upon the differential pressure measured by the differential pressure sensor across the valve.

The discrete valve flow rate converter may be configured to utilize the discrete distribution function to reconstruct the discrete value flow rate in terms of the differential pressure and the given open position, based upon the system characteristic calibration data and numerical interpolations using the aforementioned Equation:

$$g(Q, dP, d)=0,$$

The discrete flow rate converter may include a memory device configured to store the system characteristic calibration data for the valve to be monitored that is previously obtained.

The signal processor or processing module may be configured to remap or reconstruct the discrete valve flow rate Q, e.g., using the numerical interpolations by implementing a 3D numerical remapping algorithm, which may include, or take the form of, 2D interpolation or 2D Splines.

The apparatus may include an automatic control valve in which the given valve open position d can be controlled automatically, including where the signal processor or processing module is configured to provide automatic valve control signaling to control the given valve open position d.

By way of example, the signal processor or processing module may include, or take the form of, at least one signal processor and at least one memory including computer program code, and the at least one memory and computer program code are configured to, with at least one signal processor, to cause the signal processor at least to receive the signaling (or, for example, the associated signaling) and determine the corresponding signaling, based upon the signaling received. The signal processor or processing module may be configured with suitable computer program code in order to implement suitable signal processing algorithms and/or functionality, consistent with that set forth herein.

According to some embodiments, the present invention may also take the form of a method including steps for:
- receiving in a signal processor or processing module signaling containing information about a differential pressure sensed across a valve in an open position and system characteristics calibration data plotted as a discrete distribution function; and
- determining in the signal processor or processing module corresponding signaling containing information about a discrete valve flow rate of the valve, based upon the signaling received.

The method may also include one or more of the features set forth herein, including providing from the signal processor or processing module corresponding signaling containing information about the discrete valve flow rate, e.g., which may be used to control the valve in the a dynamic hydronic pumping system.

The present invention may also, e. g., take the form of a computer program product having a computer readable medium with a computer executable code embedded therein for implementing the method, e.g., when run on a signal processing device that forms part of such a pump or valve controller. By way of example, the computer program product may, e. g., take the form of a CD, a floppy disk, a memory stick, a memory card, as well as other types or kind of memory devices that may store such a computer executable code on such a computer readable medium either now known or later developed in the future.

The instant application provides a new technique that is a further development of, and builds upon, the aforementioned family of technologies set forth herein.

BRIEF DESCRIPTION OF THE DRAWING

The drawing includes the following Figures, which are not necessarily drawn to scale:

FIG. 1 is a schematic diagram of a valve flow rate measurement system having a 3D valve flow rate converter, according to some embodiments of the present invention.

FIG. 2 is a schematic diagram of a 3D valve flow rate converter, according to some embodiments of the present invention.

FIG. 3 is a graph of flow (GPM) in relation to valve openings (%) and pressure (Ft) showing a distribution of valve system characteristic, according to implementations of some embodiments of the present invention.

FIG. 4 includes FIGS. 4A through 4D showing plots of comparisons of testing data or results using a discrete valve flow rate converter according to the present invention (see readings identified by square symbols) and a corresponding flow meter (see readings identified by circular symbols) on a circuit setter respectively, e.g., where

FIG. 5 is a block diagram of apparatus, e.g., having a signal processor or processing module configured for implementing the signal processing functionality, according to some embodiments of the present invention.

DETAILED DESCRIPTION OF THE INVENTION

FIGS. 1-4

Figure 4A:
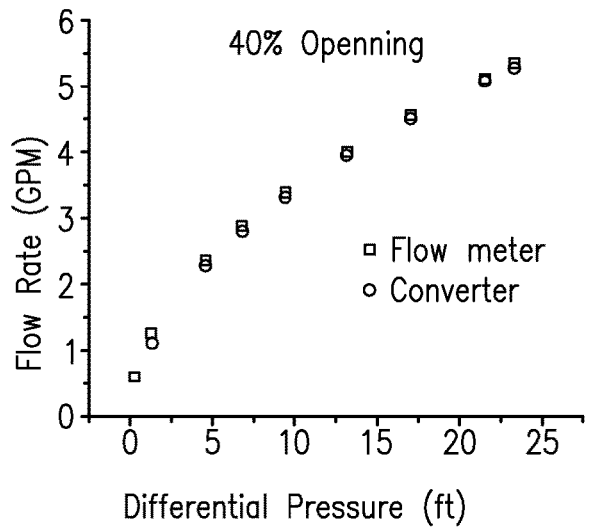
FIG. 4A shows test results for a valve having a 40% opening.
Figure 4B:
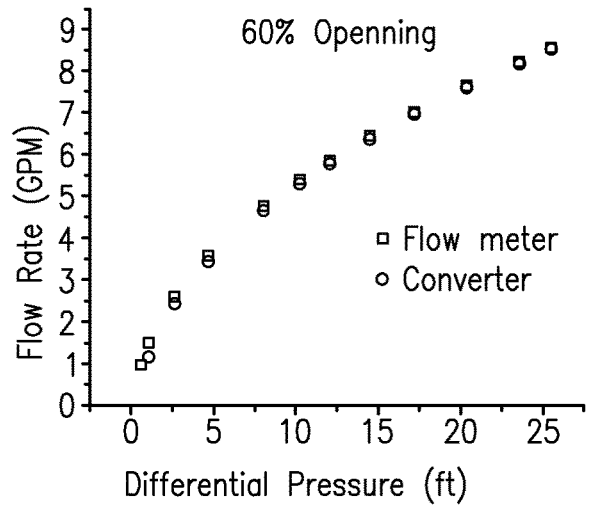
FIG. 4B shows test results for a valve having a 60% opening.
Figure 4C:
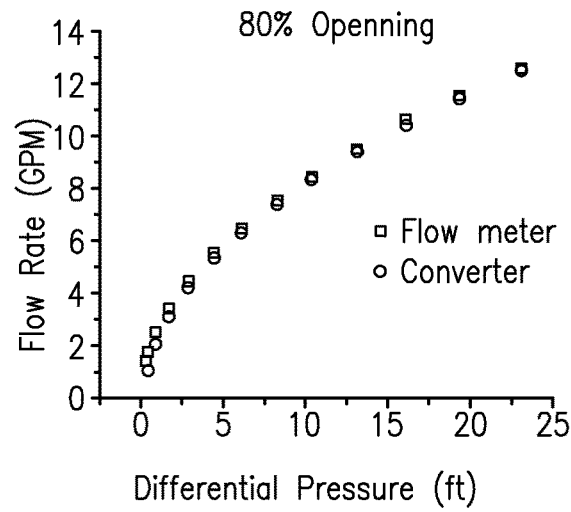
FIG. 4C shows test results for a valve having an 80% opening.

FIG. 1 shows a hydronic valve flow rate measurement system generally indicated as 20 that consists of a mobile CPU device 22 with a discrete valve flow converter 24 (FIG. 2) and a differential pressure sensor or meter 26 arranged in relation to a valve 28. FIG. 2 shows the discrete valve flow converter 24 configured to provide a valve system flow rate Q at a given valve open position d, based upon signalling received containing information about the differential pressure dP measured by the differential pressure sensor or meter 26 configured or arranged across the valve 28 and the given valve open position d.

By way of example, FIG. 3 shows a 3D plot of a distribution of valve hydronic characteristics, e.g., which include the valve flow rate (GPM) with respect to the differential pressure (ft/lb) associated with valve openings (%).

The discrete valve flow converter 24 may be configured to use a discrete distribution function to reconstruct the valve system flow rate of the valve 28 in relation to its differential pressure and open position, e.g., based on the system characteristics calibration data and numerical interpolations represented by Equation (1), as follows:

$$g(Q, dP, d)=0, \qquad (1)$$

where g is a distribution function of the valve flow rate Q with respect to the differential pressure dP across the valve 28 having a given opening position d. The valve flow function reconstructed in Eq. (1) may be used to obtain any instantaneous valve system flow rate at the differential pressure measured and known and at a given valve open position respectively.

Figure 4D:
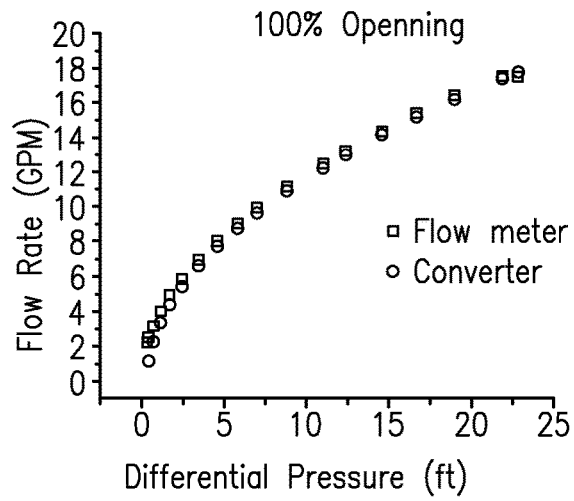
FIG. 4D shows test results for a valve having a 100% opening.

FIG. 4 shows plots of some testing data or results on such a valve flow rate converter like 24 on a circuit setter, e.g., for openings of 40% (FIG. 4A), 60% (FIG. 4B), 80% (FIG. 4C), and 100% (FIG. 4D). FIG. 4A through 4D each include two plots, one plot showing a flow rate measured by a flow meter (not shown herein) represented or indicated by a series of square symbols, and another plot showing a flow rate determined by the discrete valve flow rate converter represented or indicated by a series of circular symbols. (As shown, at higher differential pressures and flow rates, the series of square symbols and the series of circular symbols tend to merge together or overlap, indicating that the flow rate measured by the flow meter and the flow rate determined by the discrete valve flow rate converter according to the present invention are very similar and in many cases substantially the same.)

By way of example, in order to use the discrete valve flow rate converter 24 (FIG. 2), the calibration data or discrete valve system characteristics for the valve 28 to be monitored would typically first need to be obtained. As a person skilled in the art would appreciate, the higher the positioning accuracy of valves, such as some control valves and circuit setters, the higher accurate calibration data that may be obtained, and the higher the system flow rate conversion accuracy that may be achieved consequently. Although the discrete valve flow rate converter set forth herein may be applied to all kinds of valves as long as the open position of the valve and the differential pressure across the valve can be obtained, it may be preferably implemented in the control valve applications, e.g., where the valve's open position can be controlled automatically and accurately so that the valve system flow rate may be monitored continuously and correspondingly. Furthermore, the system flow rate converted by the converter according to the present invention may be used in relation to other pumping controls, such as pump adaptive pressure controls (see [1-2] above).

FIG. 5: Implementation of Signal Processing Functionality

By way of example, FIG. 5 shows apparatus 10 according to some embodiments of the present invention, e.g., featuring a signal processor or processing module 10a configured at least to:
  receive signaling containing information about a differential pressure sensed across a valve in an open position and system characteristics calibration data plotted as a discrete distribution function; and
  determine corresponding signaling containing information about a discrete valve flow rate of the valve, based upon the signaling received.

In operation, the signal processor or processing module may be configured to provide corresponding signaling containing information about the discrete valve flow rate of the valve. The corresponding signaling may contain information used to control a pumping hydronic system.

By way of example, the signal processing functionality may be implemented in the 3D discrete valve flow rate converter 24 (FIG. 2), which may form part of the mobile CPU device 22 (FIG. 1).

The signal processor or processing module 10a may be configured in, or form part of, a pump and/or valve control panel, e.g., which may include or be implemented in conjunction with a valve control or controller configured therein.

As a person skilled in the art would appreciate and understand, the present invention may be implemented using valve system characteristics and associated equations, e.g., consistent with that set forth herein, as well as by using other types or kinds of valve system characteristics and associated equations that are either now known or later developed in the future.

By way of example, the functionality of the apparatus 10 may be implemented using hardware, software, firmware, or a combination thereof. In a typical software implementation, the apparatus 10 would include one or more microprocessor-based architectures having, e. g., at least one signal processor or microprocessor like element 10a. A person skilled in the art would be able to program with suitable program code such a microcontroller-based, or microprocessor-based, implementation to perform the functionality described herein without undue experimentation. For example, the signal processor or processing module 10a may be configured, e.g., by a person skilled in the art without undue experimentation, to receive the signaling containing information about the differential pressure sensed across the valve in the open position and system characteristics calibration data plotted as the discrete distribution function, consistent with that disclosed herein.

Moreover, the signal processor or processing module 10a may be configured, e.g., by a person skilled in the art without undue experimentation, to determine the corresponding signaling containing information about the discrete valve flow rate of valve, based upon the signaling received, consistent with that disclosed herein.

The scope of the invention is not intended to be limited to any particular implementation using technology either now known or later developed in the future. The scope of the invention is intended to include implementing the functionality of the processors 10a as stand-alone processor, signal processor, or signal processor module, as well as separate processor or processor modules, as well as some combination thereof.

The apparatus 10 may also include, e.g., other signal processor circuits or components 10b, including random access memory or memory module (RAM) and/or read only memory (ROM), input/output devices and control, and data and address buses connecting the same, and/or at least one input processor and at least one output processor, e.g., which would be appreciate by a person skilled in the art.

Various Points of Novelty

The present invention may also include, or take the form of, one or more of the following various embodiments:

For example, according to some embodiments the present invention may take the form of, or may be implemented as, a discrete valve flow rate converter that includes a numerical converter which yields the system flow rate through a valve at an open position based on the corresponding valve differential pressure as well as the valve hydronic characteristics calibration data.

According to some embodiments, the present invention may be implemented as a discrete valve flow rate converter as set forth above, e.g., that may include using a valve characteristics function of the system flow rate with respect to valve open position and the associated differential pressure as represented in Eq. 1 and FIG. 3.

According to some embodiments, the present invention may be implemented using the remapping and reconstruction of the discrete valve flow rate converter set forth above, e.g., that may also include using all potential 3D discrete numerical remapping methods, such as 2D interpolations, 2D Splines, and so forth.

According to some embodiments, the present invention may be implemented using the discrete valve flow rate converter set forth herein in automatic control valve application, e.g., where the valve open position can be controlled automatically and accurately.

According to some embodiments, the present invention may be implemented using the valve characteristics calibration data measured for the valve flow rate converter set forth above, e.g., that may also include using the valve system flow rate with respect to valve open position and its associated differential pressure. In this case, the valve open position may be its physical open position or its position reference signal including the corresponding electrical signal or mechanical readouts. The input signals for the discrete flow rate converter would be suitably adapted to the calibration reference signals accordingly.

According to some embodiments, the present invention may be implemented using the discrete valve flow rate converter set forth above that may also be applied to all type of valves in any close loop or open loop hydronic pumping systems, such as primary pumping systems, secondary pumping systems, water circulating systems, and pressure booster systems. By way of further example, the systems mentioned here may also consist of hydronic systems having a single zone, multiple zones, etc.

According to some embodiments, the present invention may be implemented using signals transmitting and wiring technologies for the valve flow rate, as well as input valve open position and differential pressure, and which may also include all conventional transmitting means known and used currently in the art. For example, wireless sensor signal transmission technologies may in some cases provide favorable implementation.

The Equations and Discrete Distribution Functions

The aforementioned equations and discrete distribution function (g(Q, dP, d)=0) for implementing the present invention are known in the art, and provided by way of example.

Moreover, the scope of the invention is intended to include using other types or kinds of equations or distribution functions that are either now known or later developed in the future, as well as variations of the aforementioned equations, all within the spirit of the present invention.

The Differential Pressure Sensor or Meter 26

Differential pressure sensors or meters like element 26 are known in the art, and the scope of the invention is not intended to be limited to any particular type or kind thereof that is either now known or later developed in the future.

The Valve 28

Valves like element 28 are known in the art, and the scope of the invention is not intended to be limited to any particular type or kind thereof that is either now known or later developed in the future. Moreover, techniques for determining a given valve opening position like parameter d for a valve like element 28, as well as techniques for provisioning suitable signaling containing information about the given valve opening position d, are also known in the art; and the scope of the invention is not intended to be limited to any particular type or kind thereof that is either now known or later developed in the future.

Valve Hydronic Characteristics and Discrete Distribution Functions

Techniques for determining a valve's hydronic characteristics, and techniques for plotting distributions of such valve hydronic characteristics, e.g., like that shown in FIG. 3, are also known in the art; and the scope of the invention is not intended to be limited to any particular type or kind thereof that is either now known or later developed in the future.

Moreover, a person skilled in the art would be able to implement the underlying invention without undue experimentation based upon that disclosed herein, including determining a valve's hydronic characteristics, and plotting distributions of such valve hydronic characteristics like that shown in FIG. 3.

The Discrete System Characteristic Calibration Data

As a person skilled in the art would appreciate, discrete system characteristic calibration data of the flow rate Q is understood to be either measured data from a lab or from a valve's production line. The discrete system characteristic calibration data may then be coded into a control program to reconstruct the discrete distribution function of flow rate Q by using a numerical interpolation algorithm.

Numerical Interpolation Algorithm

Numerical interpolation algorithm are known in the art, and the scope of the invention is not intended to be limited to any particular type or kind thereof either now known or later developed in the future.

Other Related Applications

In addition to applications [1] and [2] set forth above, this application is also related to other patent applications that form part of the overall family of technologies developed by one or more of the inventors herein, and disclosed in the following applications:

[3] U.S. application Ser. No. 14/091,795 (Atty Dckt No. 911-019.009-2//F-B&G-X0005), filed 27 Nov. 2013, entitled "3D sensorless conversion method and apparatus," which claims benefit to U.S. provisional application No. 61/771,375, filed 1 Mar. 2013, now abandoned;

[4] U.S. application Ser. No. 14/187,817 (Atty Dckt No. 911-019.010-2//F-B&G-X0008), filed 24 Feb. 2014, entitled "A Mixed Theoretical And Discrete Sensorless Converter For Pump Differential Pressure And Flow Monitoring," which claims benefit to U.S. provisional application No. 61/803,258, filed 19 Mar. 2013, now abandoned;

[5] U.S. application Ser. No. 14/339,594 (Atty Dckt No. 911-019.012-2//F-B&G-X0010US01), filed 24 Jul. 2014, entitled "Sensorless Adaptive Pump Control with Self-Calibration Apparatus for Hydronic Pumping System," which claims benefit to U.S. provisional application Ser. No. 14/339,594 (Atty Dckt No. 911-019.012-1//F-B&G-X0010US01), filed 24 Jul. 2014, now abandoned;

[6] U.S. application Ser. No. 14/680,667 (Atty Dckt No. 911-019.014-2//F-B&G-X0012US01), filed 7 Apr. 2015, entitled " A Best-fit affinity sensorless conversion means for pump differential pressure and flow monitoring," which claims benefit to provisional patent application Ser. No. 61/976,749 (Atty Dckt No. 911-019.014-1//F-B&G-X0012US01), filed 8 Apr. 2014, now abandoned; and

[7] U.S. application Ser. No. 14/730,871 (Atty Dckt No. 911-019.015-2//F-B&G-X0013US01), filed 4 Jun. 2015, entitled "System and flow adaptive sensorless pumping control apparatus energy saving pumping applications," which claims benefit to provisional patent application Ser. No. 62/007,474 (Atty Dckt No. 911-019.015-1//F-B&G-X0013US01), filed 4 Jun. 2014, now abandoned;

which are all assigned to the assignee of the instant patent application, and all incorporated by reference in their entirety.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawing herein is not drawn to scale.

Although the present invention is described by way of example in relation to a centrifugal pump, the scope of the invention is intended to include using the same in relation to other types or kinds of pumps either now known or later developed in the future.

Although the invention has been described and illustrated with respect to exemplary embodiments thereof, the foregoing and various other additions and omissions may be made therein and thereto without departing from the spirit and scope of the present invention.

What we claim is:

1. A valve flow rate measurement system comprising:
a differential pressure sensor configured to sense a sensed differential pressure measured across a valve in an open position, and provide signaling containing information about the sensed differential pressure;
a memory device configured to store system characteristics calibration data plotted as a 3-dimensional (3D) discrete distribution function of valve flow rates with respect to differential pressures across the valve at given open positions for the valve to be monitored that is previously obtained, and provide stored signaling containing information about the system characteristics calibration data and numerical interpolations corresponding to the sensed differential pressure; and
a 3D discrete valve flow rate converter having a signal processor or processing module configured at least to:
receive the signaling and the stored signaling, and
provide control signaling containing information to open and close the valve and control a discrete valve flow rate of the valve, based upon the signaling and the stored signaling received.

2. The valve flow rate measurement system according to claim 1, wherein the valve flow rate measurement system comprises an automatic control valve in which a given valve open position d can be controlled automatically, including where the signal processor or processing module is configured to provide the control signaling as automatic valve control signaling to control the given valve open position d of the automatic control valve.

3. The valve flow rate measurement system according to claim 1, wherein the valve flow rate measurement system is a pumping hydronic control system in a dynamic hydronic pumping system.

4. The valve flow rate measurement system according to claim 1, wherein the 3D discrete valve flow rate converter is configured to
respond to associated signaling containing information about both a given sensed differential pressure dP across the valve and a given valve open position d of the valve, and
provide an associated discrete valve flow rate Q by utilizing the 3D discrete distribution function to reconstruct the associated discrete value flow rate Q in terms of the given sensed differential pressure dP and the given valve open position d, based upon the system characteristic calibration data and numerical interpolations using the Equation:

$$g(Q, dP, d)=0,$$

where g is the 3D discrete distribution function of the associated discrete valve flow rate, Q, with respect to the given sensed differential pressure dP across the valve with the given valve open position d.

5. The valve flow rate measurement system according to claim 1, wherein the valve flow rate measurement system comprises a mobile CPU device having the 3D discrete valve flow rate converter configured to provide the discrete value flow rate at the given open position.

6. The valve flow rate measurement system according to claim 5, wherein the 3D discrete valve flow rate converter is configured to utilize the 3D discrete distribution function to reconstruct the discrete value system flow rate in terms of the sensed differential pressure and a given open position, based upon the system characteristic calibration data and numerical interpolations as the Equation:

$$g(Q, dP, d)=0,$$

where g is the 3D discrete distribution function of the discrete valve flow rate, Q, with respect to the sensed differential pressure, dP, across the valve with the given open position, d.

7. The valve flow rate measurement system according to claim 1, wherein the signal processor or processing module is configured to remap or reconstruct the discrete valve flow rate Q using the numerical interpolations by implementing a 3D numerical remapping algorithm, which may include, or take the form of, 2D interpolation or 2D Splines.

8. A method comprising:
sensing, with a differential pressure sensor, a sensed differential pressure measured across a valve in an open position, and providing signaling containing information about the sensed differential pressure;
storing, with a memory device, system characteristics calibration data plotted as a 3-dimensional (3D) discrete distribution function of valve flow rates with respect to differential pressures across the valve at given open positions for the valve to be monitored that is previously obtained, and providing stored signaling containing information about the system characteristics calibration data and numerical interpolations corresponding to the sensed differential pressure;
receiving, with a signal processor or processing module, the signaling and the stored signaling; and
providing, with the signal processor or processing module, control signaling containing information to open and close the valve and control a discrete valve flow rate of the valve, based upon the signaling and the stored signaling received.

9. The method according to claim 8, wherein the method further comprises configuring the 3D discrete valve flow rate converter in a pumping hydronic control system.

10. The method according to claim 8, wherein the method further comprises configuring the 3D discrete valve flow rate converter to respond to associated signaling containing information about both a given sensed differential pressure dP across the valve and a given valve open position d of the valve, and provide an associated discrete valve flow rate Q by utilizing a 3D discrete distribution function to reconstruct the associated discrete value flow rate Q in terms of the given sensed differential pressure dP and the given valve open position d, based upon the system characteristic calibration data and numerical interpolations using the Equation:

$$g(Q, dP, d)=0,$$

where g is the 3D discrete distribution function of the associated discrete valve flow rate, Q, with respect to the given sensed differential pressure dP across the valve with the given valve open position d.

11. The method according to claim 8, wherein the method further comprises remapping or reconstructing, with the signal processor or processing module, the discrete valve flow rate Q using the numerical interpolations by implementing a 3D numerical remapping algorithm, which may include, or take the form of, 2D interpolation or 2D Splines.

12. A hydronic pumping system comprising:
an automatic control valve configured to respond to valve control signaling, and open and close to control a discrete valve flow rate of a fluid flowing through the automatic control valve;
a differential pressure sensor configured to sense a sensed differential pressure measured across the automatic control valve, and provide signaling containing information about the sensed differential pressure;
a memory device configured to store system characteristics calibration data plotted as a 3-dimensional (3D) discrete distribution function of valve flow rates with respect to differential pressures across the automatic control valve at given open positions for the automatic control valve to be monitored that is previously obtained, and provide stored signaling containing information about the system characteristics calibration data and numerical interpolations corresponding to the sensed differential pressure; and
a 3D discrete valve flow rate converter having a signal processor or processing module configured at least to:
receive signaling and the stored signaling, and
provide the valve control signaling containing information to open or close the automatic control valve and control the discrete valve flow rate of the automatic control valve, based upon the signaling and stored received.

13. The hydronic pumping system according to claim 12, wherein the 3D discrete valve flow rate converter is configured to
respond to associated signaling containing information about both a given sensed differential pressure dP across the automatic control valve and a given valve open position d of the automatic control valve, and
provide an associated discrete valve flow rate Q by utilizing the 3D discrete distribution function to reconstruct the associated discrete value flow rate Q in terms of the given sensed differential pressure dP and the given valve open position d, based upon the system characteristic calibration data and numerical interpolations using the Equation:

$$g(Q, dP, d)=0,$$

where g is the 3D discrete distribution function of the associated discrete valve flow rate, Q, with respect to the given sensed differential pressure dP across the automatic control valve with the given valve open position d.

14. The hydronic pumping system according to claim 12, wherein the hydronic pumping system comprises a mobile CPU device having the 3D discrete valve flow rate converter configured to provide the discrete value flow rate at the given open position.

15. The hydronic pumping system according to claim 14, wherein the 3D discrete valve flow rate converter is configured to utilize the 3D discrete distribution function to reconstruct the discrete value system flow rate in terms of the sensed differential pressure and a given open position, based upon the system characteristic calibration data and numerical interpolations as the Equation:

$$g(Q, dP, d)=0,$$

where g is the 3D discrete distribution function of the discrete valve flow rate, Q, with respect to the sensed differential pressure, dP, across the automatic control valve with the given open position, d.

16. The hydronic pumping system according to claim 12, wherein the signal processor or processing module is configured to remap or reconstruct the discrete valve flow rate Q using the numerical interpolations by implementing a 3D numerical remapping algorithm, which may include, or take the form of, 2D interpolation or 2D Splines.

* * * * *